United States Patent [19]

Howe et al.

[11] 4,322,460
[45] Mar. 30, 1982

[54] SPRAYABLE POLYESTER COATING

[75] Inventors: Rodney R. Howe, Tacoma; Quentin F. Ruonavaara, Kent, both of Wash.

[73] Assignee: The Boeing Company, Seattle, Wash.

[21] Appl. No.: 899,231

[22] Filed: Apr. 24, 1978

[51] Int. Cl.³ .......................... B05D 1/02; B05D 1/12
[52] U.S. Cl. ..................................... 427/426; 427/421
[58] Field of Search ................................ 427/421, 426

[56] References Cited

U.S. PATENT DOCUMENTS

| | | | |
|---|---|---|---|
| 2,823,143 | 2/1958 | Upperman | 427/426 X |
| 3,249,304 | 5/1966 | Faro et al. | 427/426 X |
| 3,276,901 | 10/1966 | Lovell et al. | 427/426 X |
| 3,485,655 | 12/1969 | Cole et al. | 427/426 X |
| 3,490,936 | 1/1970 | Cole et al. | 427/426 X |
| 3,535,151 | 10/1970 | Raffel et al. | 427/426 X |
| 3,676,197 | 7/1972 | Harrison et al. | 427/426 X |
| 3,930,061 | 12/1975 | Scharfenberger | 427/27 |
| 3,967,004 | 6/1976 | Oda et al. | 427/426 X |
| 4,013,614 | 3/1977 | Self | 260/40 R |
| 4,022,935 | 5/1977 | Kinney et al. | 427/426 X |

FOREIGN PATENT DOCUMENTS 837455  6/1960  United Kingdom ................ 427/426

Primary Examiner—Shrive P. Beck
Attorney, Agent, or Firm—Christensen, O'Connor, Johnson & Kindness

[57] ABSTRACT

A sprayable polyester resin comprises a liquid polyester resin mixture and a catalyst solution comprising benzoyl peroxide dissolved in a liquid ketone such as cyclohexanone. The resin mixture and catalyst solution are admixed upstream of a spray nozzle and sprayed simultaneously onto a surface to be coated. The resin component preferably incorporates a relatively inert filler material such as glass microballoons.

12 Claims, No Drawings

SPRAYABLE POLYESTER COATING

BACKGROUND OF THE INVENTION

The present invention relates to polyester resins, and more particularly to a two component sprayable polyester resin mixture, and most particularly to such a sprayable resin mixture incorporating a filler material that function as a fast curing surface sealer for porous surfaces.

Decorative honeycomb panels are employed as interior walls and partitions in aircraft and in other structures requiring lightweight but strong and rigid wall and partition members. The honeycomb panels comprise a honeycomb core onto which are laminated surface panels. The surface panels and the cores are usually composed of a phenolic/epoxy polymer or similar material. The exterior surface of the surface panels is usually quite porous and contains pinholes which must be filled prior to application of an exterior decorative lamina to the panels. In accordance with prior art techniques, a surface filler is employed to fill the pores and pinholes in the surface of the panels and is thereafter sanded to form a smooth, nonporous base layer onto which decorative coatings are laminated. One prior art surface filler includes a polyester resin and styrene monomer mixed with fillers such as talc or glass microballoons. Prior to application to the panels, the filled polyester resin is admixed with a promoter, such as dimethyl aniline, and a peroxide catalyst, such as methylethylketone peroxide or benzoyl peroxide. Since benzoyl peroxide in its pure form is a solid, it is normally admixed with a catalyst carrier, such as butylbenzyl phthalate, to form a catalyst paste. When the paste is added to the resin mixture, viscous resinous mass is formed which cannot be brushed or sprayed onto a surface. Once the catalyst paste is added to the filled polyester resin, the resin begins to cure almost immediately, requiring that the catalyzed resin mixture be applied to the honeycomb surface panels soon after mixing. Consequently, the resulting catalyzed resin mixture is normally applied with a spatula to the surface panel as soon as the catalyst is added to the resin. The resin mixture is then allowed to cure and is thereafter sanded to form a smooth, nonporous substrate onto which one or more decorative laminae can be applied.

Although the foregoing composition and application method are satisfactory to produce a sealed surface on honeycomb panels, they do have certain drawbacks. Since the catalyzed resin mixture is applied with a spatula, the resulting coating is relatively thick and also has a considerable variation in thickness. Further, hand application of the resin mixture is laborious and thus less efficient than is desired. Moreover, once the catalyst and resin are intermixed, the resulting mixture must be applied to the surface within a very short time. Thus, considerable time is periodically employed in mixing batches of resin for immediate application to surface panels, which time could otherwise be advantageously used to coat additional panels.

Accordingly, it is a broad object of the present invention to provide a surface sealer for honeycomb panels that has a long shelf life, that requires little or no mixing effort, and that is easy to apply in a relatively thin and even coating on a surface panel. It is a further object of the present invention to provide a fast curing, sprayable surface sealer for honeycomb surface panels, and more particularly to provide a fast curing, sprayable, polyester resin based surface sealer. Further objects of the present invention are to provide such a sprayable polyester composition that can be sprayed with relatively unsophisticated and inexpensive equipment and that will not tend to clog or plug the spray nozzles of the equipment. Most importantly, it is an object of the present invention to provide such a sprayable polyester resin surface sealer that cures sufficiently so that it can be sanded in on the order of from 30 to 45 minutes and that is easily sandable to a smooth, nonporous substrate onto which decorative laminae can be applied.

SUMMARY OF THE INVENTION

In accordance with the foregoing objects and other objects that will become apparent to one of ordinary skill in the art after reading the ensuing specification, the present invention provides a fast curing, polyester resin based surface sealer and a method for applying the fast curing surface sealer to a porous surface. The fast curing surface sealer prior to application comprises two components. The first component is a liquid polyester resin, preferably in admixture with a filler such as talc or glass microballoons. More importantly, the second component of the sealer comprises a liquid catalyst solution comprising benzoyl peroxide dissolved in a liquid ketone such as cyclohexanone. The two components are applied to the porous surface by feeding the liquid polyester resin mixture to a spray nozzle, forming a spray at the nozzle and directing the spray toward the surface to be sealed. Simultaneously, the liquid catalyst solution is fed to a location upstream from the spray nozzle and is intermixed with the resin mixture at that location prior to forming a spray from the resin mixture.

When sprayed onto a surface to be sealed, a relatively thin coating of the surface sealer is formed that is adequate to fill the pores in the surface and to leave sufficient excess sealer on the surface so that the sealer can be sanded to a smooth, substantially planar surface onto which decorative or other laminae can be applied. The resulting resin composition is capable of curing in on the order of 45 minutes. Further, although benzoyl peroxide crystals are sensitive to heat and shock, when benzoyl peroxide is dissolved in cyclohexanone, the resulting mixture is substantially less sensitive and needs no special care in handling or storage. It has further been found that the cyclohexanone does not need to be evaporated from the surface sealer as do many solvents for many similar systems. In fact, it is believed that the presence of the cyclohexanone in the surface coating adds unexpected desirable qualities to the coating. For example, a coating containing cyclohexanone is more flexible and is tougher than coatings of the prior art. It is also believed that a ketone as cyclohexanone is responsible for inhibiting the exothermic nature of the curing reaction since the temperature of the curing coating is substantially less than that, for example, experienced with other prior art catalysts such as methylethylketone peroxide. Moreover, as opposed to a resin catalyzed by methylethylketone peroxide, the coating of the present invention does not exhibit any cracking, crazing, darkening or smoking, and does not cause the honeycomb panel to warp during curing.

DETAILED DESCRIPTION OF THE INVENTION

The sprayable, two component surface sealing composition of the present invention comprises a flowable resin component and a liquid catalyst component. The preferred resin component comprises an uncured polyester resin, many of which are commercially available. For purposes of the present invention, the term "polyester resin" will include any of the group of thermosetting synthetic resins that are polycondensation products of dicarboxylic acids with dihydroxy alcohols. Further for purposes of the present invention, such polyester resins are unsaturated and are cross-linkable through their double bonds with a compatible monomer containing ethylenic unsaturation, such as styrene. Suitable commercially available polyester resins containing styrene as the cross-linking agent include "Silmar S41" casting resin available from Silmar Division of Bistron Corporation of Hawthorne, California and "Hetron 32A" compression molding resin, available from Ashland Chemical Company of Columbus, Ohio.

For purposes of the present invention, other additives such as acrylic monomers can be added to the polyester resin component without adversely affecting the results achieved by the present invention. A suitable acrylic monomer is methylmethacrylate. It has been found that adding a monomer such as methylmethacrylate to the polyester resin component enhances the weatherability of the cured surface coating. Moreover, the acrylic monomer functions as a diluent for the polyester resin as well as a comonomer cross-linking agent with the styrene or other ethylenically unsaturated monomer already present in the resin. It has been found that the acrylic monomers can be added in amounts up to about 12% by weight of the total resin without any adverse affect on the sprayability, curing or other desirable characteristics of the resin.

Before the polyester resin component is utilized, a promoter must be added to negate the effect of the inhibitor or inhibitors normally present in the resin. The promoter is usually added to the polyester resin component when combined with other additives. Once the promoter is added, the shelf life of the resin will be reduced to on the order of 14 days. Suitable promoters include dimethyl aniline.

A filler is preferably added to the polyester resin component and performs a twofold purpose. First, the filler functions to provide a surface sealer coating that is easily sandable. Secondly, the filler significantly reduces the overall weight of the sealer coating. Any suitable, relatively inert filler can be employed in accordance with the present invention. By "relatively inert" it is meant a composition that will not undergo any significant chemical rection with the polyester resin, any of the additives thereto, or the catalyst component. Suitable relatively inert fillers include talcum powder and minute hollow glass spheres or spheroids, commonly referred to as microballoons. The microballoon filler is preferred because it is significantly lighter on a volume ratio than is talcum powder and tends to be more easily sandable than does the talc. Any of a variety of suitable microballoons can be employed, including those available from the 3-M Company, Minneapolis, Minnesota, under the trademark "3M Glass Bubbles" (Specification No. C15/250), and those available from Philadelphia Quartz Co., of Philadelphia, Pennsylvania under the trademark "Q-Cell Microspheres." The inert filler material can be added in the polyester resin in a weight ratio range of from 8:95 to 18:110, polyester resin to inert filler material.

In accordance with the present invention, a wax sealer for the coating composition is preferably added to the polyester component. The wax sealer for the polyester component is an internal wax that forms a surface coating on the polyester resin once sprayed onto a surface panel. The wax sealer functions to eliminate the air inhibition of the curing or cross-linking reaction which would otherwide occur. A suitable wax sealer is available from Fiberlay Company, Seattle, Washington, under the trademark "Surface Seal." Other additives can also be added to the polyester component without detracting from the advantages of the present invention. Such additives include fire retardants, lubricants, viscosity adjusters, and pigments such as titanium dioxide.

The catalyst component of the fast curing sprayable resin is critical to the present invention. The catalyst component comprises benzoyl peroxide crystals, preferably a reagent grade, dissolved in a ketone that is a liquid at room temperature. Suitable ketones are those aliphatic and alicyclic ketones having less than about 12 carbon atoms, such as methylethylketone, methylisobutyl ketone and cyclohexanone. Of the foregoing, cyclohexanone is most preferred as it least affects the cure time of the surface coating of the present invention. As stated previously, the ketone functions not only as a solvent for the benzoyl peroxide but further provides unexpected advantages associated with the resin once sprayed onto a surface to be sealed. Specifically, the ketone does not need to be evaporated from the resin once sprayed as do other conventional solvents. Further, the ketone does function to control the exothermic nature of the curing or crosslinking reaction of the resin once applied to the surface to be sealed. The ketone must be employed in amounts sufficient to completely dissolve the benzoyl peroxide crystals up to an excess amount that does not adversely affect the curing time. Most preferably, reagent grade benzoyl peroxide crystals and reagent grade cyclohexanone are combined in a weight ratio range of from 20:95 to 18:105. If less cyclohexanone is employed, the benzoyl peroxide crystals will not be completely dissolved. If more cyclohexanone is used then dictated by the foregoing weight ratios, the cure time of the resin, once sprayed onto a surface, is lengthened beyond the preferred 30 to 45 minute time period.

Any of a variety of conventional spray equipment can be utilized to spray the two component resin mixture of the present invention. A suitable inexpensive spray system is the model 69GW two component spray gun available from Binks Manufacturing Co., of Franklin Park, Illinois. The Binks two component spray gun operates on pneumatic pressure which is directly applied to the spray nozzle. Pneumatic pressure, less than that applied to the nozzle, is also applied to the pot containing the resin component. The liquid catalyst component is fed into and intermixed with the resin component immediately upstream of the nozzle. The liquid catalyst component is drawn from the catalyst pot via a negative pressure, venturi effect of the resin passing the outlet conduit from the catalyst pot immediately upstream of the nozzle. The liquid catalyst component is combined in the Binks model 69GW spray gun on a weight ratio of about 8 parts catalyst component to 100 parts resin. This weight ratio can be varied within the range of from 6:90 to 10:105 (catalyst component to resin component) without adversely affecting the preferred results in accordance with the present invention.

EXAMPLES

The following Examples are intended to illustrate to one of ordinary skill in the art how to make and use the invention disclosed herein. The Examples are not intended to be a comprehensive listing of all possible additive components, weight ratios, and cure times. They are therefore not intended in any manner to delimit the scope of the present invention as disclosed.

EXAMPLE I

A catalyst component for the sprayable polyester resin of the present invention is prepared by combining 19 parts by weight of benzoyl peroxide crystal with 100 parts by weight of reagent grade cyclohexanone. The benzoyl peroxide crystals are completely dissolved in the cyclohexanone.

A resin component of a sprayable polyester mixture is prepared by combining 100 parts by weight of Silmar S41 resin, 12 parts by weight of methylmethacrylate monomer, 3 parts by weight of wax-type surface sealer, 0.8 parts by weight of dimethyl aniline, 1.8 parts by weight of Cab-O-Sil (a colloidal silica available from Cabot Corporation of Boston, Massachusetts), 2.2 parts by weight of aluminum hydrate (Hydrol 710, available from the Alcoa Company of Pittsburgh, Pennsylvania), 2.7 parts by weight of titanium dioxide, 3.0 parts by weight of 3-M Company C-15/250 glass bubbles (microballoons that are from 2 to 4 microns in diameter), and 1.2 parts by weight of Glidden G-100 silica (available from the Glidden-Durkee Division, SCM Corporation of Jacksonville, Florida). The methylmethacrylate monomer functions to improve the hardness, flexibility and wearability of the final resin surface sealer once applied, cured and sanded. The wax-type surface sealer functions to seal the surface of the polyester resin so that there is no air inhibition to the surface cure. The Cab-O-Sil functions to thicken the resin component and to hold the microballoons in suspension so that they do not settle out when the resin component is stored. The aluminum hydrate is added as a fire retardant and filler. The titanium dioxide is added as a fire retardant and as an opaquing pigment. The Glidden silica enhances the flowability of the resin component so that it sprays more easily through a nozzle. Although the glass bubbles comprise only 3 parts by weight of the total resin component, the glass bubbles account for about 50% of the volume of the resin component.

The resin component is added to the resin pot of a Binks model 69GW spray gun while the catalyst component is added to the catalyst pot of the gun. 100p.s.i.g. line pressure is applied to the pneumatic inlet to the spray gun while 20 p.s.i.g. is applied to the resin pot. No pressure is applied to the catalyst supply pot.

The resin and catalyst components are combined in the Binks Model 69GW spray gun in a weight ratio of 8:100 and then sprayed onto a porous honeycomb surface panel composed of a urethane epoxy resin. The thickness of the sprayed coat is on the order of from 15 to 20 mils. The polyester resin mixture gels in from 3 to 5 minutes after it is sprayed and cures sufficiently to be sandable in less than 45 minutes. 45 minutes after the polyester resin mixture is applied to the honeycomb panel, the coating is sanded down to a thickness of slightly less than 10 mils. The resulting surface coating on the honeycomb panel is very smooth and is nonporous. The panel is then allowed to stand for an additional 23 hours to assure a complete cure of the resin.

EXAMPLE II

The procedure of Example I is repeated, substituting methylethylketone peroxide, a liquid catalyst, for the benzoyl peroxide/cyclohexanone catalyst component. The methylethylketone peroxide catalyst is combined with the resin mixture in a weight ratio of 3:100 during spraying. The resulting resin mixture is completely unsatisfactory for the intended purpose as the methylethylketone peroxide catalyzed system allows the curing reaction to proceed at a very rapid rate, giving off excess heat that causes smoking of the film, warping of the honeycomb panel, and shrinkage of the surface layer itself.

The present invention has been disclosed in relation to a preferred embodiment. One of ordinary skill will be able to effect various changes, substitutions of equivalents, and other alterations to the method and compositions disclosed herein without departing from the broad concepts disclosed. For example, various fillers can be utilized within the purview of the prevent invention in quantities varying over quite a large range without adversely affecting the results. For example, the amount of filler employed can be reduced by on the order of $\frac{1}{2}$ while still maintaining a sprayable system. It is therefore intended that the grant of Letters Patent hereon be limited only by the definition contained in the appended claims and equivalents thereof.

The embodiments of the invention in which an exclusive property or privilege is claimed are defined as follows:

1. A method of forming an improved, nonporous, fast curing polyester resin surface coating on a surface of a porous substrate comprising the steps of:
    creating a spray comprising a mixture of a first and second component, said first component comprising a polyester resin mixture, said second component comprising benzoyl peroxide dissolved in cyclohexanone,
    directing said spray onto said surface to form a layer comprising a mixture of said first and second components; and,
    thereafter curing said mixture of said first and said second components to form said coating without allowing said ketone to evaporate prior to curing.

2. The method of claim 1 wherein said polyester resin mixture comprises a mixture of polyester resin, a promoter for said resin, and a relatively inert filler material.

3. The method of claim 2 wherein said resin mixture further comprises a minor proportion by weight of an acrylic monomer.

4. The method of claim 3 wherein said acrylic monomer comprises methylmethacrylate.

5. The method of claim 2 wherein said resin mixture further comprises a minor proportion by weight of a pigment.

6. The method of claim 5 wherein said pigment comprises titanium dioxide.

7. The method of claim 2 wherein said promoter comprises dimethyl.

8. The method of claim 2 wherein said resin mixture further comprises a minor proportion by weight of a fire retardant.

9. The method of claim 2 wherein the weight ratio of cyclohexanone to benzoyl peroxide is in the range of from 18:105 to 20:95.

10. The method of claim 9 wherein the weight ratio of polyester resin to inert filler material is in the range of 8:95 to 18:110.

11. The method of claim 9 wherein said inert filler is selected from the group consisting of hollow glass spheres and talcum powder.

12. The method of claim 1 wherein said catalyst solution consists essentially of benzoyl peroxide dissolved in cyclohexanone.

* * * * *